(12) United States Patent
Brunner et al.

(10) Patent No.: US 11,389,893 B2
(45) Date of Patent: Jul. 19, 2022

(54) ULTRASONIC WELDING OF A CABLE SHOE IN A POSITIVELY LOCKING MANNER

(71) Applicant: Auto-Kabel Management GmbH, Hausen i.W. (DE)

(72) Inventors: Nicolas Brunner, Petitefontaine (FR); Dany Zuschlag, Masevaux (FR)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 16/880,163

(22) Filed: May 21, 2020

(65) Prior Publication Data
US 2020/0282492 A1 Sep. 10, 2020

Related U.S. Application Data (62) Division of application No. 15/548,987, filed as application No. PCT/EP2016/050097 on Jan. 6, 2016, now abandoned.

(30) Foreign Application Priority Data

Feb. 6, 2015 (DE) ...................... 20 2015 000 879.8
Apr. 23, 2015 (DE) ...................... 10 2015 106 265.8

(51) Int. Cl.
*B23K 20/26* (2006.01)
*H01R 4/02* (2006.01)
(Continued)

(52) U.S. Cl.
CPC .............. *B23K 20/26* (2013.01); *B23K 20/10* (2013.01); *B23K 20/106* (2013.01); *B23K 20/24* (2013.01);
(Continued)

(58) Field of Classification Search
CPC ............................................. B23K 20/10–106
See application file for complete search history.

(56) References Cited

U.S. PATENT DOCUMENTS

| | | | |
|---|---|---|---|
| 3,382,564 A | 5/1968 | Gallentine | |
| 3,628,716 A | 12/1971 | Fastre | |

(Continued)

FOREIGN PATENT DOCUMENTS

| | | | |
|---|---|---|---|
| CN | 1314554 A | 9/2001 | |
| CN | 1398712 A | 2/2003 | |

(Continued)

OTHER PUBLICATIONS

German Patent Office, Office Action, Application No. 10 2015 106 265.8, dated Sep. 1, 2020, 8 pages (in German).

(Continued)

*Primary Examiner* — Erin B Saad
*Assistant Examiner* — Carlos J Gamino
(74) *Attorney, Agent, or Firm* — Sunstein LLP (57) ABSTRACT

Ultrasonic welding device having a sonotrode (28) and an anvil (26), in which a flat part and at least one joining part are arranged between the sonotrode (28) and the anvil (26) during ultrasonic welding, and wherein a fastening element is held in a positively locking manner between the flat part and the joining part, and a damping element (22) that presses on the fastening element (8*a*) is provided, which is pressed on the fastening element in such a way that a relative movement between the fastening element and the flat part and/or the joining part is restricted during ultrasonic welding.

9 Claims, 10 Drawing Sheets

(51) Int. Cl.
- *B23K 20/10* (2006.01)
- *B23K 20/24* (2006.01)
- *H01R 43/02* (2006.01)
- *B23K 101/38* (2006.01)
- *H01R 11/26* (2006.01)

(52) U.S. Cl.
CPC ......... *H01R 4/027* (2013.01); *H01R 43/0263* (2013.01); *B23K 2101/38* (2018.08); *H01R 11/26* (2013.01)

(56) References Cited

U.S. PATENT DOCUMENTS

| | | | |
|---|---|---|---|
| 4,638,937 | A | 1/1987 | Belanger, Jr. |
| 4,835,847 | A | 6/1989 | Kamperman |
| 4,848,639 | A | 7/1989 | Belanger, Jr. |
| 5,172,846 | A | 12/1992 | Hayashi et al. |
| 5,249,726 | A | 10/1993 | Sato |
| 5,611,478 | A | 3/1997 | Asanasavest |
| 5,655,700 | A | 8/1997 | Pham et al. |
| 5,826,778 | A | 10/1998 | Sato et al. |
| 5,974,654 | A | 11/1999 | Morita |
| 6,103,034 | A | 8/2000 | Fujiwara et al. |
| 6,108,144 | A | 8/2000 | Holderer et al. |
| 6,309,490 | B1 * | 10/2001 | Davis ............ B29C 65/08 156/251 |
| 6,485,240 | B2 | 11/2002 | Stumpf et al. |
| 6,709,769 | B1 * | 3/2004 | Pedretti ............ B23K 20/103 428/626 |
| 6,877,650 | B2 | 4/2005 | Marsh et al. |
| 6,880,742 | B2 | 4/2005 | Voss et al. |
| 7,347,347 | B2 | 3/2008 | Kira et al. |
| 7,726,540 | B2 | 6/2010 | Cheng et al. |
| 8,720,767 | B2 | 5/2014 | Byars et al. |
| 8,870,051 | B2 | 10/2014 | Brofman et al. |
| 9,931,684 | B2 | 4/2018 | Jurich et al. |
| 2001/0013532 | A1 | 8/2001 | Higashi et al. |
| 2006/0105589 | A1 * | 5/2006 | Ackerman ......... H01R 43/0242 439/34 |
| 2007/0251978 | A1 | 11/2007 | Konieczka |
| 2008/0023529 | A1 * | 1/2008 | Reatherford ........... B23K 20/10 228/110.1 |
| 2011/0049221 | A1 | 3/2011 | Blais et al. |
| 2012/0107546 | A1 | 5/2012 | Schroth et al. |
| 2016/0052081 | A1 * | 2/2016 | Regenberg ............ B23K 20/106 228/110.1 |
| 2016/0151966 | A1 * | 6/2016 | Melack ................... B29C 66/87 156/73.1 |
| 2016/0288246 | A1 | 10/2016 | Ichinose et al. |
| 2018/0141163 | A1 * | 5/2018 | Wendt ............... H01L 21/67144 |

FOREIGN PATENT DOCUMENTS

| | | |
|---|---|---|
| CN | 101367171 A | 2/2009 |
| CN | 102699586 A | 10/2012 |
| CN | 203853671 U | 10/2014 |
| DE | 87 02 983 * | 6/1988 |
| DE | 87 02 983 U1 | 6/1988 |
| DE | 92 12 560 U1 | 3/1993 |
| DE | 198 33 590 C1 | 3/2000 |
| DE | 10 2006 020 418 A1 | 10/2007 |
| DE | 10 2012 006 641 A1 | 10/2013 |
| EP | 0 913 246 A1 | 5/1999 |

OTHER PUBLICATIONS

German Patent and Trademark Office, Office Action—Application No. 10 2015 106 265.8, dated Oct. 14, 2015, 5 pages (in German).
International Searching Authority, International Search Report—International Application No. PCT/EP2016/050097, dated Jul. 4, 2016, together With the Written Opinion of the International Searching Authority, 13 pages (in German).
International Preliminary Examining Authority, International Preliminary Report on Patentability—International Application No. PCT/EP2016/050097, dated May 19, 2017, 18 pages (In German).
International Preliminary Examining Authority, International Preliminary Report on Patentability—International Application No. PCT/EP2016/050097, dated Aug. 17, 2017, 8 pages (In English).
State Intellectual Property Office of P.R.C., Notification of the First Office Action, Application No. 201680009089.5, dated Feb. 25, 2019, 27 pages (with English translation).

* cited by examiner

ULTRASONIC WELDING OF A CABLE SHOE IN A POSITIVELY LOCKING MANNER

CROSS-REFERENCE TO RELATED APPLICATIONS

This application is a divisional of U.S. application Ser. No. 15/548,987, which is the national phase entry of international patent application no. PCT/EP2016/050097 filed Jan. 6, 2016, the disclosures of which are incorporated herein by reference in their entirety. These applications all claim the benefit of German patent applications No. 10 2015 106 265.8, filed Apr. 23, 2015 and No. 20 2015 000 879.8, filed Feb. 6, 2015

TECHNICAL FIELD

The subject matter relates to an ultrasonic welding device and a method for ultrasonic welding.

BACKGROUND ART

Nowadays various welding methods are available which essentially differ simply by the way in which the heat is generated. The ultrasonic welding method has established itself as a tried and tested technique for strong and reliable connection of cables, clamps and fasteners particularly in motor vehicles.

In ultrasonic welding, the electrical oscillations produced by an ultrasonic generator are converted by an energising unit into mechanical oscillations and transmitted to a welding tool, the sonotrode. The sonotrode transmits the mechanical oscillations to the parts to be welded, the weld metal, arranged between the sonotrode and a counter-piece, the anvil. Through the transfer of the ultrasonic oscillations to the weld metal heat-inducing intermolecular friction results. Via a force directed by the sonotrode vertically onto the weld metal the parts to be welded between the sonotrode and the anvil are fused at the weld point, resulting in a permanent and homogenous welded joint.

The ultrasonic welding technique is characterised, inter alia, by low welding times and the formation of strong and durable connections of the weld metal.

A problem with ultrasonic welding, however, is if movable parts are arranged in the vicinity of the weld point. While the parts to be welded between the sonotrode and the anvil are secured through the force of the sonotrode directed vertically onto these, nevertheless other movable parts located in the vicinity of the weld point are unintentionally placed in motion by the mechanical oscillations during the welding process. The movements induced can be translational movements, rotational movements or oscillatory movements, all of which reduce the quality of the welded connection and can lead to surface damage or even the formation of cracks.

The object cannot be achieved simply by holding down the movable parts, because in this case undesired marks and scratches may be created on the movable parts and also on the flat part and the bearing surface.

In this connection, coated parts, such as those with a tinned surface for corrosion protection, are particularly vulnerable to surface damage.

For this reason, the object of the application was to provide a device and a method for ultrasonic welding, which reduces the movements induced by the welding as far as possible to protect the material. The device should furthermore be as simple as possible to retrofit to existing systems.

SUMMARY OF THE EMBODIMENTS

In an ultrasonic welding device, the weld metal to be welded can be arranged between the sonotrode and the anvil. In this case a flat part is welded to a joining part or connection part, by way of example a cable core, particularly strands of a cable, by means of ultrasonic welding (USW).

With USW oscillations are introduced into the flat part. These oscillations are able to spread across the flat part and are particularly transmitted to the components arranged on the flat part, particularly fasteners. These parts that are not secured to the flat part similarly start to oscillate and can cause damage to the surfaces of the parts through the vibrations thereby caused.

A fastening element can also be arranged on a flat part and particularly held between the flat part and a joining part in a positively locking manner. The fastening element, however, can also be arranged captively on the flat part without the joining part, e.g. by suitable pressing or similar. A damping element that presses on the fastening element during USW can be arranged according to the invention such that a relative movement between the fastening element and the flat part and/or the joining part is restricted during ultrasonic welding, preferably prevented.

According to the subject-matter the fastening element is pressed against the flat part with the help of at least one damping element, arranged on the USW device. As a result of the contact pressure on the one hand the fastening element is supported on the flat part, thereby reducing, preferably preventing, vibrations through the USW into the fastening element. In addition, through the contact pressure the fastening element is pressed against the flat part such that the flat part is elastically deformed by the contact pressure. Here, the strain in the direction of the contact pressure is preferably between 0.5 and 1%. Through this strain the flat part is damped, so that the oscillation impressed by the USW is damped in the flat part itself.

Also relevant for the quality of ultrasonic welding processes, is the design of the sonotrode. It can be made from various materials. Preferably sonotrodes made from aluminium, titanium or steel can be used, but other suitable materials can also be used. The structural shapes of the sonotrodes can also vary significantly and can, by way of example, be of rectangular, rounded, conical, or cylindrical form. The working surface of the sonotrode is preferably as even as possible in form, as it is only this that comes into direct contact with the weld metal and the intention is to avoid marks. The mechanical oscillation passed on by the sonotrode for welding the weld metal can run vertically as well as parallel to the parts to be welded.

A restriction of the movement of the fastening element and of the flat part and/or the joining part can mean that the fastening element can then only perform slight translational, rotational and vibratory movements in relation to the flat part and/or the joining part. Here such translational movements can preferably involve a movement of at least less than 5 mm along the contact surfaces between the fastening element and the flat part and/or the joining part, preferably less than 1 mm, particularly preferably less than 0.2 mm. Such rotational movements can involve a rotation of preferably less than 5° about the axis vertical to the contact surface between the fastening element and the flat part and/or the joining part, preferably less than 1°, particularly preferably less than 0.2°. Such vibrational movements can involve an excursion vertically to the contact surface between the fastening element and the flat part and/or the joining part of less than 5 mm, preferably of less than 1 mm, particularly preferably less than 0.2 mm.

Restricting the movement of the fastening element relative to the flat part and/or the joining part prevents the surface of the flat part being damaged. The quality of the welded joint can be optimised. Cables, clamps or connecting elements used in welded joints in motor vehicles, in particular, call for high levels of stability and durability. Thus, welded joints in motor vehicles are intended to as far as possible function over the entire life of the vehicle. By damping the flat part through elastic deformation caused by the contact pressure of the damping elements, the flat part itself is damped and at a weld point in the area of the flat part a welding process is optimised.

A positively locking holding of the fastening element between the flat part and the joining part is particularly advantageous in the formation of a material bond between the joining part and the flat part, in which the joining part has the task of retaining the fastening element in position. Thus, the fastening element, by way of example, cannot slip while the joining part is being connected to the flat part by ultrasonic welding. Vibration of the fastening element relative to the flat part during welding of the flat part to a cable by USW can also be prevented.

According to an embodiment it is proposed that the fastening element is held on the flat part in a free-running manner. Held in a free-running manner can in this context mean that the fastening element, while being held, can nevertheless rotate about its longitudinal axis. This means, by way of example, that where a nut is used as the fastening element, it is possible, that despite the free-running holding a screw can be screwed down by rotating the nut about its longitudinal axis.

The holding in a free-running manner can be achieved by the fastening element engaging radially behind a groove in a borehole of the flat part on one side and on the other pressing with a head or flange on the surface of the flat part in the area of the perimeter of the borehole.

The joining part can also partially or fully surround the fastening element. The joining part can be implemented as a kind of fixing ring which surrounds at least parts of the fastening element. The fixing ring can, by way of example, be implemented such that the fastening element is only partially encompassed, and similarly it can fully surround the fastening element. The joining part can also be a kind of securing nut which fully encloses the fastening element instead of just encompassing it. The joining part is preferably made from metal, but can be made from a non-metallic material such as for example a plastic.

According to an embodiment it is proposed that the fastening element is held in a free-running manner by two joining parts. Holding with the help of two joining parts ensures greater flexibility with regard to the arrangement of the joining parts. Thus, a fastening element can also be held by two angularly formed joining parts secured to the flat part. Securing of the angularly formed joining parts could be carried out particularly simply by using z-shaped joining parts, wherein the surface of the z-shaped joining part bearing on the flat part is joined by an ultrasonic welding method to the flat part in a substance-to-substance manner. The desired free running of the fastening element can, however, require a part-circular design of the upper collar of the joining part with z-holding angle shape. Apart from an arrangement of two joining parts an arrangement of three or more joining parts for retaining the fastening element is also conceivable.

An arrangement would further be conceivable in which the one or more joining parts can be fixed in a material bond, positive fit or friction-fit manner not through ultrasonic welding, but in another way, to the flat part. Thus, by way of example, one or more joining parts can hold a fastening element in a positively fit, in that it is glued, screwed, riveted or soldered to the flat part.

It is also proposed that the flat part is welded at a first end with a connecting part, e.g. with a cable or a cable core, or strands of a cable by means of USW. At the same time, with the help of the USW device the fastening element is pressed against the flat part. To this end on the USW a holding arm is provided, on which the damping element is arranged. By means of the holding arm, the damping element is pushed axially in the direction of the fastening element.

One of the contact surfaces between the sonotrode and the at least one joining part or a connecting part to be welded to the flat part is arranged spatially separated from the fastening element. Thus, the fastening element can be arranged remote from the sonotrode on the flat part. Oscillations by the sonotrode are conducted by the flat part. With the help of the damping element according to the subject-matter it is possible to extensively damp these oscillations, so that the fastening element vibrates as little as possible relative to the flat part.

On the USW device, at least two side pushers are arranged preferably so they can move linearly in relation to one another. The flat part can be secured by means of the side pushers, in that it is clamped between the side pushers. The flat part preferably protrudes either side of the side pushers. On one side, the flat part can be welded to a cable by USW. On the other side of the side pushers, the flat part with the fastening element can protrude. When the fastening element is inserted in the USW it can be guided by a guide which engages on the fastening element, so that the flat part is aligned with the fastening element to the side pushers.

Following clamping, the flat part is held between side pushers for USW.

On one of the side pushers a holding arm can be arranged. Whereas the side pushers are moved linearly on the flat part towards each other, in contrast the holding arm can be moved angularly, particularly perpendicularly towards it, on the surface of the flat part. In this way, a damping element arranged on the holding arm can be moved towards the fastening element. With the help of a suitable contact pressure the damping element can be pushed against the fastening element. In this way, the vibration of the fastening element is substantially suppressed. At the same time with suitable contact pressure the flat part can be elastically deformed. Through this deformation, the oscillation from the USW can also be damped in the flat part itself. On the side of the fastening element axially opposite the first damping element a second damping element can be provided. This preferably presses just on the flat part, but not directly on the fastening element. The fastening element, together with the flat part, is then pressed between the two damping elements. This leads to optimum damping and simultaneously to mechanical protection of the flat part on the side of the second damping element.

The at least one damping element is arranged on a side of the holding arm facing towards the fastening element. Thus, the first damping element can be pushed against the fastening element.

A second damping element can be arranged on a surface of the anvil facing towards the flat part. Here the anvil can be understood to be the bearing surface of the flat part on the USW. The anvil is not just the part of the USW device opposite the sonotrode, but is understood in a broader sense here. According to the subject-matter, the anvil is arranged on the side on which the flat part presses on the USW device, or on the side of the flat part facing away from the fastening element. The second damping element is provided on this side. It is clamped between the flat part and the anvil. The second damping element is preferably clamped between the guide for the fastening element and the anvil. The guide for the fastening element can also be understood to be a holding unit.

The first damping element of the USW is preferably arranged directly at or on the fastening element. Here the second damping element is preferably arranged on the flat part. In particular, the second damping element is spaced apart from the fastening element. Thus, during USW no contact results between the second damping element and the fastening element.

Due to the holding arm being movable in the direction of the fastening element, the damping element can be pressed against the fastening element so that it elastically deforms with a travel of at least 0.1 mm, preferably between 0.5 mm and 5 mm, particular approximately 1 mm, 2 mm, 3 mm, 4 mm or 5 m. Depending on the elasticity of the damping element the travel can be set such that the fastening element is pushed with sufficient force against the flat part.

The holding arm presses the first damping element preferably with a contact pressure of at least 0.1 bar, preferably of at least 1 bar, particularly between 1 bar and 6 bar, preferably between 3 bar and 6 bar against the fastening element. Depending on the contact pressure, other elastic deformations of the flat part occur and the damping of the USW oscillation can vary.

The damping element can be positioned particularly easily on the holding arm, if the first damping element is arranged with a transition fit or a press fit on the holding arm, particularly in a blind hole in the holding arm.

As already mentioned, oscillations from the USW can be damped in the flat part, if the holding arm pushes the damping element against the fastening element so that the flat part is elastically deformed.

At least one of the damping elements can be made from an elastic material, particularly an elastomer, particularly a polyurethane. The material preferably has a Shore hardness of between 40 and 120, particularly of between 60 and 100 Shore, preferably of approximately 80 Shore, preferably according to DIN EN ISO 868 and/or DIN ISO 7619-1. The damping element preferably has a shear modulus of 10-500 M Pa at ambient temperature. In this way, particularly good damping characteristics for oscillations are achieved in the ultrasonic range.

According to an embodiment the sonotrode is arranged laterally from the fastening element. Here in particular at least one of the contact surfaces 29 of the sonotrode and of the at least one joining part or the cable is arranged laterally from the fastening element. In a configuration in which at least one joining part holds the fastening element in a positively locking manner, while the joining part is connected by an ultrasound welding method in a substance-to-substance manner with the flat part, it is advantageous if the fastening element is arranged laterally from the sonotrode. Sufficient space is thus available for the formation of a welded connection between flat part and joining part. If the formation of two welded connections for securing the joining part to the flat part is desired, a repositioning of the sonotrode or the workpiece for the formation of the second welded connection is conceivable. If not, the use of a special U-shaped sonotrode would be conceivable, with which two welded connection points can be formed between at least one joining part and the flat part simultaneously. In this case, when the substance-to-substance bond is being created, the fastening element would be poisoned between the flat part and at least one joining part preferably between the two contact points of the sonotrode with the joining part.

The fastening element can be a rotating fastening element, particularly a screw, a nut, a twist and lock fastener or a bayonet fastener. The fastening element can serve to connect a fastening means, by way of example a nut as a fastening element for the connection, and vice versa. Thus, in a particularly simple manner various fastening elements can be connected to one another. The fastening element can be made from metal, preferably from copper or an alloy thereof. The rotating fastening element is in particular a forged or cold-formed part.

According to an embodiment the fastening element has a collar pointing radially outwards. Here the collar can run part or all the way around. A collar on the fastening element pointing radially outwards simplifies the design and form of the joining elements used and allows a simultaneous positive locking and free-running holding of the fastening element between joining part and flat part.

According to an embodiment the fastening element has a collar extending axially, arranged in a borehole in the flat part. This collar is bent outwards at its axial end, so that it is arranged in a groove in the area of the perimeter of the borehole, particularly a circumferential groove. In this way, the fastening element is held captively on the flat part, but remains rotatable in the borehole, if the collar is bent in the groove in a clearance fit.

According to an advantageous exemplary embodiment, the flat part is configured as a cable connection element. The cable connection element can preferably be a cable shoe, particularly a friction-welding cable shoe, crimping cable shoe, or ultrasonic welding cable shoe. Cable shoe connection elements, particularly cables, are suitable for simple and secure connection of cables particularly in motor vehicles. A cable, particularly the strands or the core of the cable can be secured using USW to the flat part. In the area of the flat part, the cable shoe is preferably metallic, made from copper or a copper alloy, aluminium or an aluminium alloy. In particular embodiments, however, it is also possible for the flat part to be made from a non-metallic material. On the flat part of the cable shoe there is a fastening element held in a positively locking manner between the flat part and at least one joining part. The fastening element can be made from copper or a copper alloy, aluminium or an aluminium alloy. The fastening element can, for example, be coated, particularly nickel-plated and/or tinned. The fastening element can be a rotating fastening element, particularly a screw, a nut, a twist-and-lock fastener or a bayonet fastener. The fastening element can serve to connect a fastening means.

According to an embodiment it is proposed that a holding unit holds the flat part in a positively locking manner between sonotrode and anvil. Here the holding unit surrounds the flat part preferably on three side and has a structure that complements the flat part. The holding unit is preferably a component made from metal, preferably a forged or cold-formed component. In an embodiment, in which the holding unit holds a U-shaped cable shoe on three sides in a positively locking manner between the sonotrode and the anvil, the holding unit has as a complementary structure preferably a U-shaped recess. In this recess, by way of example, a cable shoe can be inserted and held in a positively locking manner. This is particularly advantageous, if work has to be performed on the cable shoe, such as by way of example substance-to-substance bonding of parts by means of ultrasonic welding. A particularly stable application of the holding unit is achieved if the U-shaped recess runs substantially, preferably precisely, along the principle axis of inertia of the component. The holding unit is preferably in the form of a guide. The flat part together with the fastening element can be aligned before the USW by means of the holding unit with the USW device. Then, by means of second side pushers the flat part is secured to the USW device, in the aligned state.

The holding unit can be arranged in a positively locking manner on the anvil, preferably fixed on the anvil. Securing for stabilisation of the holding unit on the anvil can by way of example be brought about by means of at least one hole in the holding unit. The securing can then be performed using screws, threaded rods, bolts or dowels. Corresponding threads or holes can then be found in the anvil accordingly. The securing preferably takes place via at least two holes, which can be arranged symmetrically to the U-shaped recess.

In order to restrict the relative movements between the fastening element and the flat part and/or the joining part, it is proposed to arrange a damping element preferably on the fastening element. Here, an arrangement of the damping element directly on the fastening element means an arrangement directly on a surface facing towards the fastening element. This allows the greatest possible restriction of the movement of the fastening element relative to the flat part and/or the joining part. The damping element preferably also has a shape as similar as possible to that of the surface of the fastening element bordering the damping element. Thus, where the fastening element is a nut a cylindrical form with an external diameter similar to the external diameter of the head of the nut would be ideal.

According to an advantageous exemplary embodiment it is proposed that a second damping element is arranged on a surface of the anvil facing towards the flat part, preferably between the anvil and the flat part, particularly on a side of the flat part facing away from the first damping element. If between the flat part and the anvil there is no damping element present at all, the surface of the flat part in the area of the contact surface could be damaged by the anvil during ultrasonic welding.

According to an embodiment, at least one of the damping elements can be made from an elastic material, particularly from polyurethane. Apart from polyurethanes, other elastic materials with good damping properties such as rubber or plastic foam could be used.

In an advantageous embodiment, on the ultrasonic welding device a holding arm can be arranged. The holding arm can preferably be arranged such that through a force applied by the holding arm a relative movement between the fastening element and the flat part and/or joining part during ultrasonic welding is restricted. Advantageously, the force is extended as vertically as possible to the surface of the damping element. A force that is as vertical as possible to the surface of the damping element discloses in this case an efficient type of force transfer. The holding arm is furthermore preferably arranged alongside the sonotrode. Here it is possible, on the one hand, for the holding arm to be arranged as an accessory separately on a side pusher next to the sonotrode and through force transfer to the damping element a relative movement between the fastening element and the flat part and/or the joining part during ultrasonic welding is restricted.

The subject matter also covers a method for ultrasonic welding, in which a fastening element is arranged captively on a flat part, and a damping element is placed on the fastening element such that a relative movement between the fastening element and the flat part during subsequent ultrasonic welding is restricted. Preferably the relative movement between the fastening element and the flat part and/or joining part is restricted through a force applied by a holding arm vertically to the damping element.

DETAILED DESCRIPTION OF THE DRAWINGS

In the following the subject matter is explained in more detail using drawings showing exemplary embodiments. In the drawing show.

DETAILED DESCRIPTION OF SPECIFIC EMBODIMENTS

Figure 1A:
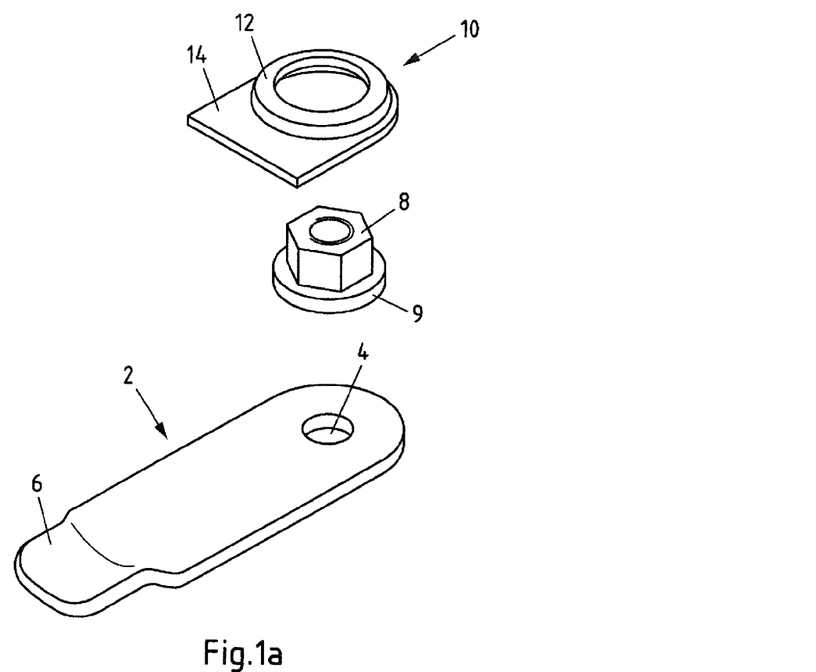
FIG. 1a an exploded view of an arrangement according to the invention of a joining part, a fastening element and a flat part.

FIG. 1a shows an arrangement according to the invention of a joining part 10, a fastening element 8 and a flat part 2. The flat part 2 has a trough 6 arranged at one end together with a through opening 4. As an example of a fastening element 8 a nut is shown, having an outwardly extending collar 9. The joining part 10 has a connecting surface 14 and a fixing ring 12 arranged next to the connecting surface 14.

The fastening element 8 can be arranged between the flat part 2 and the joining part 10 in a positively locking manner. Here the fixing ring 12 of the joining part surrounds the collar 9 running around the fastening element 8. For a simultaneous positively locking and rotatable holding of the fastening element 8 on the flat part, the fixing ring 12 of the joining part and the circumferential collar 9 of the fastening element 8 have the same profile. The external diameter of the circumferential collar 9 can also be larger than the internal diameter of the fixing ring 12, but smaller than its external diameter. In the example of an arrangement in a positively locking manner of a nut on a flat part 2, particularly a cable shoe, the advantage is that the nut, despite being captively secured, can still rotate about its longitudinal axis and thus be screwed together with a screw with a fixed arrangement.

The trough 6 located at the end serves as a receptacle for an insulation of a front-mounted stripped cable. The front-mounted end of the stripped cable can then by way of example be welded by ultrasonic welding to the flat part 2. When welding cables with cable connection elements, it is preferable to ensure that the parts to be welded comprise the same materials or the same elements, to prevent contact corrosion. Here the cable can, by way of example, be made from an aluminium material and the flat part from a copper material, wherein the flat part is, however, provided with aluminium material in the area of the joint, e.g. through roll cladding. This material combination can of course also be exactly the opposite, with the cable being made from a copper material and the flat part from an aluminium material.

Figure 1B:
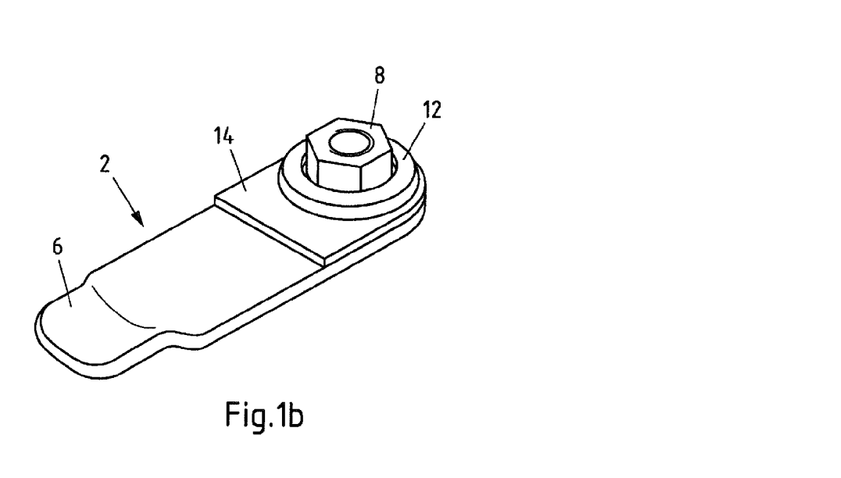
FIG. 1b the arrangement according to the invention of a joining part, a fastening element and a flat part according to FIG. 1a in the assembled state.

FIG. 1*b* shows the arrangement according to the invention of a joining part 10, a fastening element 8 and a flat part 2 according to FIG. 1*a* in the assembled state, showing the arrangement in a positively locking manner of the fastening element 8 between the flat part 2 and a joining part 10.

The connecting surface 14 of the joining part 10 can in this arrangement preferably be welded using ultrasonic welding with the flat part 2, whereas the fastening element 8 is already held by the fixing ring 12 of the joining part 10 to the flat part 2.

Figure 2A:
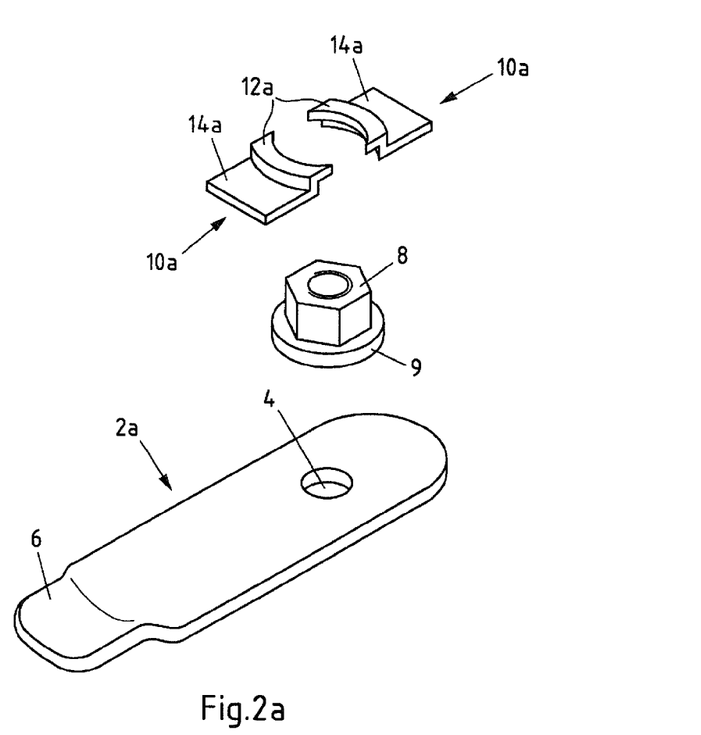
FIG. 2a an exploded view of an alternative embodiment of the arrangement according to the invention from FIG. 1a with the use of two joining parts.

FIG. 2*a* is an exploded view of an alternative embodiment of the arrangement according to the invention from FIG. 1*a* with the use of two joining parts 10*a* and a flat part 2*a* with an extended end.

The alternative embodiment of the joining parts 10*a* is comprised of a connecting surface 14*a* and a securing collar 12*a* arranged thereon. The flat part 2 has an extended end to support a second joining part 10*a*.

Through the holding with the help of two joining parts 10*a* greater flexibility regarding the arrangement of the joining parts 10*a* is ensured. In this way, immediately next to the fastening element 8 other elements can also be secured to the flat part 2*a*, since the joining part 10*a* in this embodiment is not completely circular and thus provides space for other elements. Here, the size and shape of the connecting surface 14*a* is not restricted to the embodiment shown in the figures. Alternatively, smaller or also larger connecting surfaces 14*a* of the joining parts 10*a* with other shapes can be used. All that is important here is that the connecting surface 14*a* of the joining parts 10*a* is not too small, to allow creation of a stable positively locking connection with the flat part 2*a* by ultrasonic welding.

The desired rotation capability of the fastening element 8 requires an arc-shaped configuration of the securing collars 12*a* of the joining parts 10*a*. Apart from an arrangement of two joining parts 10*a* an arrangement of three or more joining parts 10*a* for holding a fastening element 8 is also conceivable.

Figure 2B:
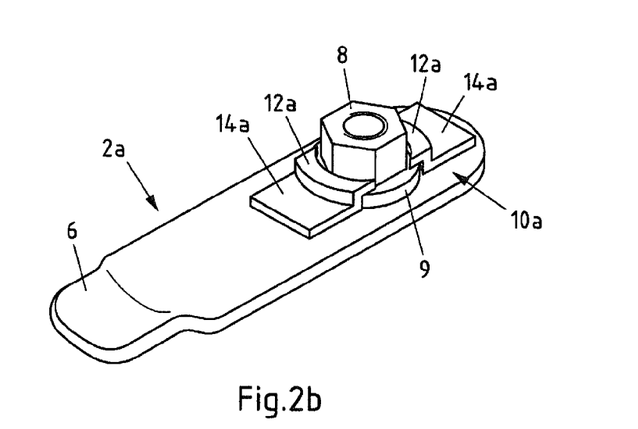
FIG. 2b the arrangement according to the invention of the alternative embodiment according to FIG. 2a in the assembled state.

FIG. 2*b* shows the alternative embodiment with the use of two joining parts 10*a* and a flat part with extended end 2 a according to FIG. 2*a* in the assembled state, illustrating the arrangement in a positively locking manner of the fastening element 8 between the flat part 2*a* and the joining parts 10*a*.

The connecting surfaces 14*a* of the joining parts 10*a* can in this arrangement preferably be welded to the flat part 2 by the ultrasonic welding process, whereas the fastening element 8 is already held by the securing collar 12*a* of the joining parts 10*a* to the flat part 2.

Here a sonotrode 28 arranged laterally to the fastening element 8 can either weld one joining part 10*a* after the other with flat part 2*a* or in the case of a U-shaped sonotrode 28 both joining parts 10 a can also be welded simultaneously to the flat part 2*a*, wherein the fastening element 8 is then preferably arranged between the U-shaped sonotrode 28.

Figure 3A:
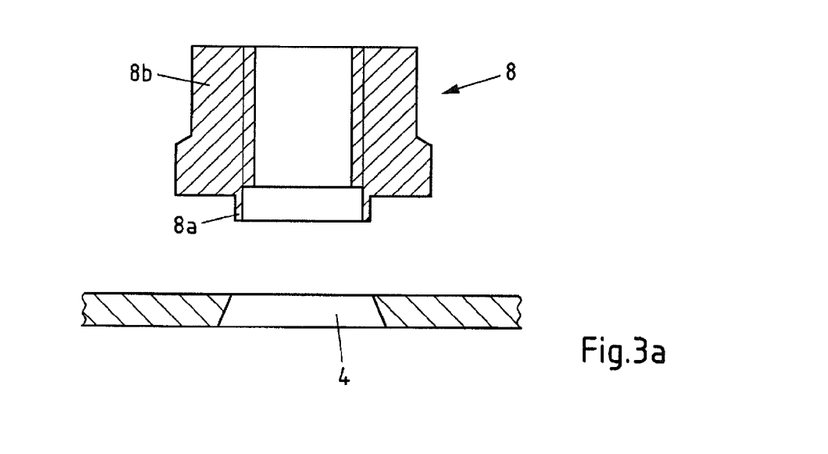
FIG. 3a a sectional view of an alternative embodiment of the arrangement according to the invention with a captive nut.

The fastening element 8, as shown in FIGS. 3*a, b*, can also take the form of a captive fastening element with an axially running collar 8*a*. A collar 8*a* can extend in an axial direction as an elongation of the fastening element 8. This collar 8*b* has a diameter corresponding approximately to the diameter of the borehole 4. In particular, the diameter is somewhat smaller, so that in the joined state according to FIG. 3*b*, the fastening element is mounted with play in the borehole 4.

Figure 3B:
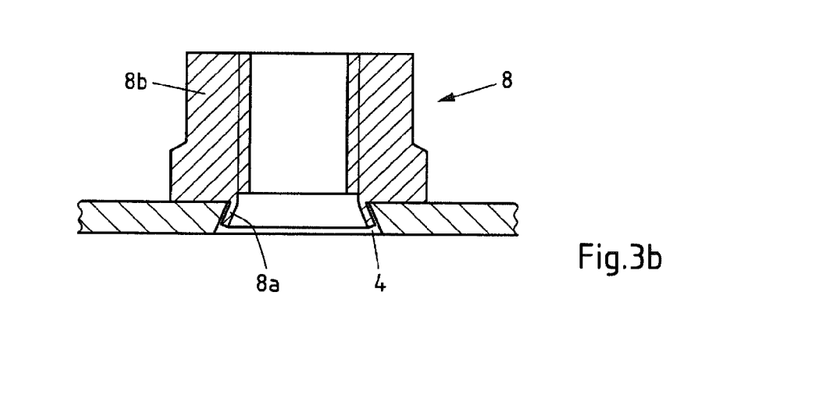
FIG. 3b a sectional view of the arrangement according to the invention of the alternative embodiment according to FIG. 3a in the assembled state.

Once the collar 8*a* has been introduced into the borehole 4, the collar 8*a* is bent outwards at its front end. Here it is useful to provide a groove 4*a* in the borehole. The collar 8*a* is thus bent in the groove 4*a*. The fastening element 8 is thus held captively on the flat part 2, but can continue rotating in the borehole 4.

Figure 11:
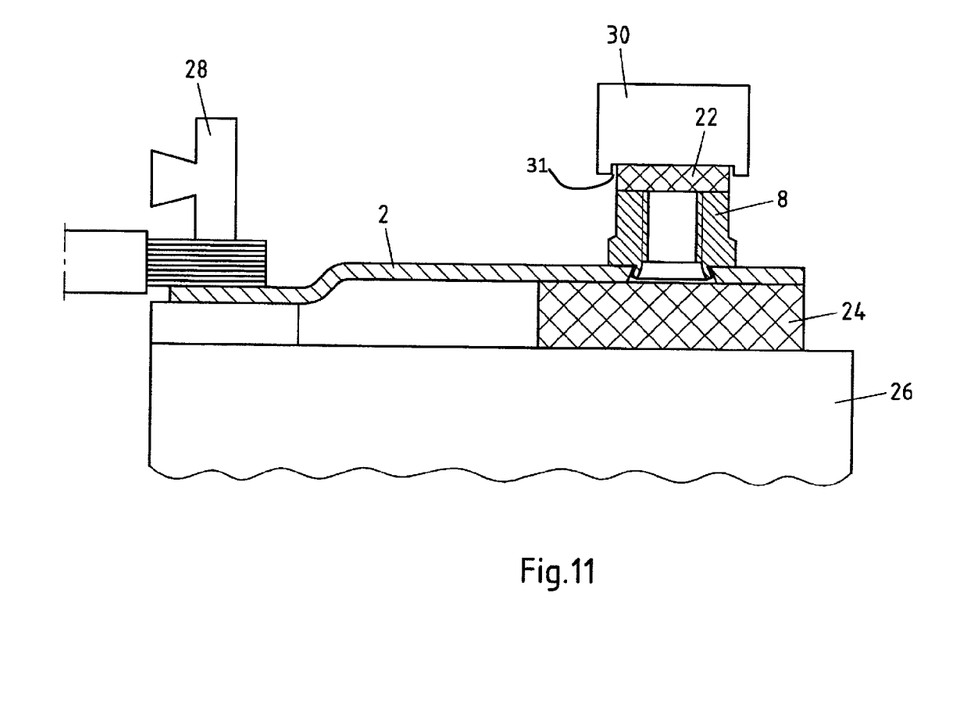
FIG. 11 a sectional view of an arrangement of a fastening element with a damping element arranged on a holding arm.
Figure 12:
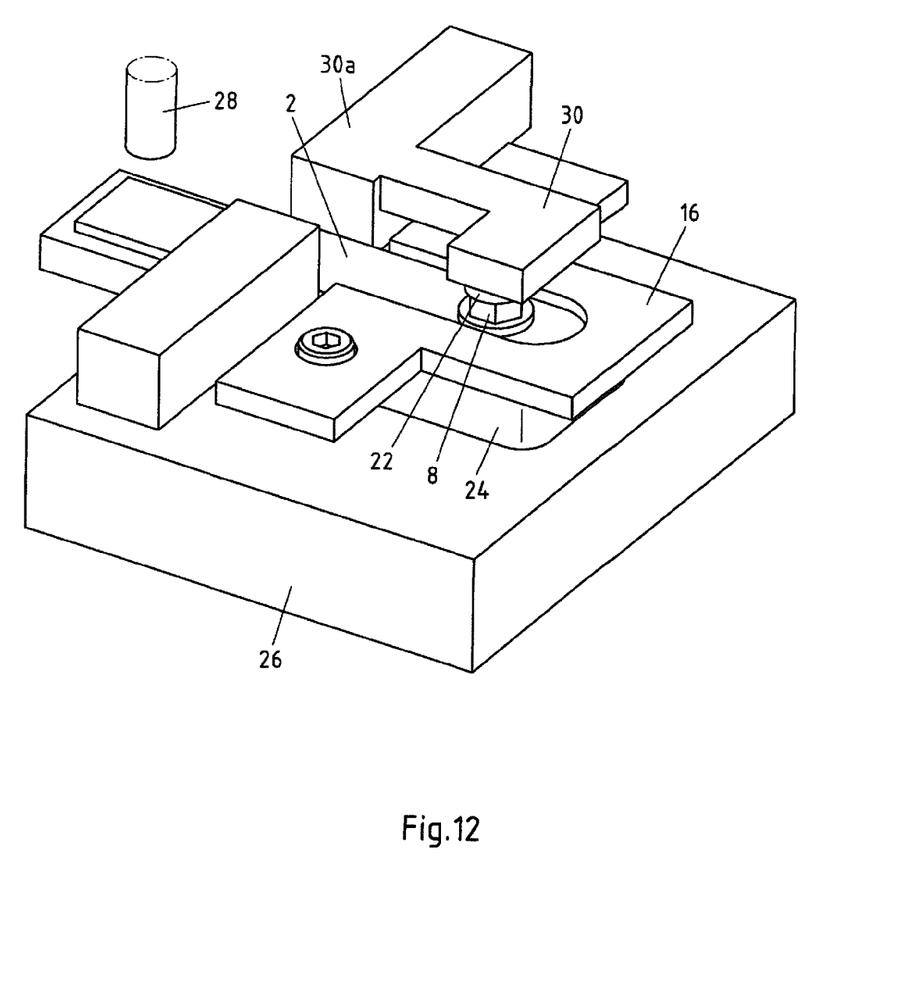
FIG. 12 a perspective representation of an arrangement of a fastening element with a damping element arranged on a holding arm.

Such a flat part can also be welded to a cable, as shown in FIGS. 11 and 12.

Figure 4:
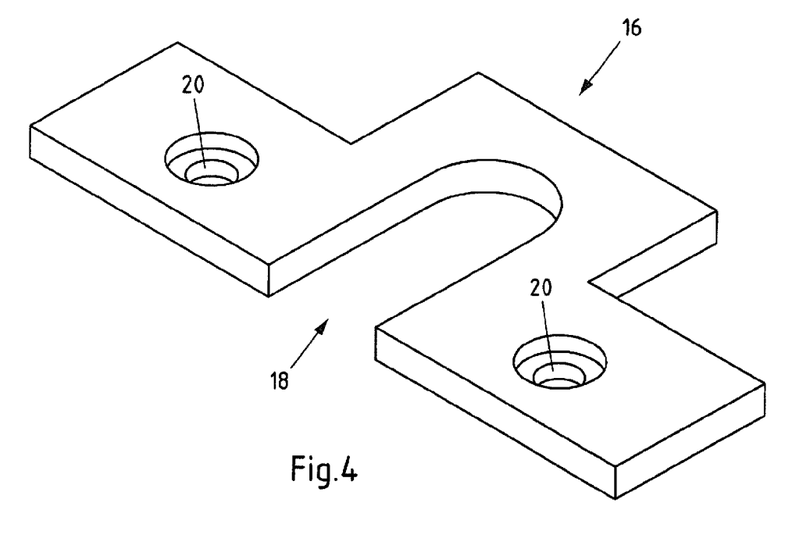
FIG. 4 the holding unit in perspective view.

FIG. 4 shows a holding unit 16 in perspective view. Two holes 20 are arranged symmetrically to a U-shaped recess 18.

The holding unit 16 is preferably a forged or cold-formed component made from metal. The U-shaped recess 18 is preferably shaped to precisely match the shape of the fastening element 8 or the flat part 2, so that the holding unit 16 holds the fastening element 8 or the flat part 2 in a positively locking manner on three sides. This is particularly advantageous if on the flat part 2, 2*a* delicate work such as for example substance-to-substance bonding of parts by means of ultrasonic welding is carried out. Then an alignment of the flat part 2 with sonotrode and anvil is important. Through the holding unit 16 the flat part 2 is precisely positioned prior to welding.

In an embodiment the flat part 2 is in the form of a cable shoe, held by the holding unit 16 and/or by side pushers preferably on three sides in a positively locking manner and positioned in relation to the sonotrode 28 and the anvil 26, whereas the joining parts 2, 2*a* or cable ends are secured by ultrasonic welding to the cable shoe.

The recess 18 is not restricted to a U-shape, differently shaped recesses can also be present in the holding unit 16. It is important that the holding unit 16 has a structure that complements the flat part 2, 2*a* or the fastening element 8, particularly the diameter of the head 8*a* of the fastening element 8.

For a more stable arrangement the holding unit 16 can also be secured to the anvil 26. Securing to stabilise the holding unit 16 on the anvil 26 can, by way of example, take place through the two holes 20 arranged symmetrically to the recess 18. The securing can take place via screws, threaded rods, bolts or dowels. Corresponding threads or holes must then be present in the anvil 26. Apart from securing via two holes 20 the holding unit 16 can also be secured in a different way to the anvil 26. By way of example, via just one hole or several holes arranged asymmetrically to the recess. Alternatively, the holding unit 16 can also be glued, riveted or secured in another way to the anvil 26.

Figure 5:
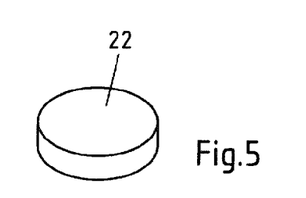
FIG. 5 the upper damping element in perspective view.
Figure 6:
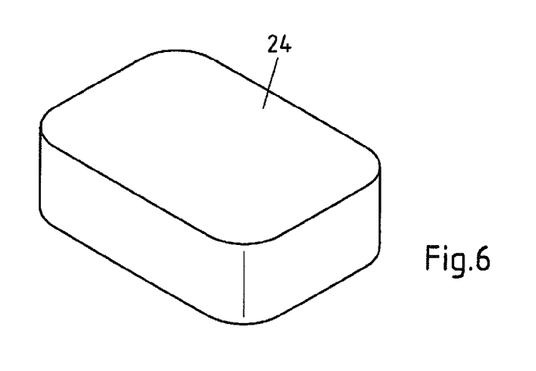
FIG. 6 the lower damping element in perspective view.

FIG. 5 and FIG. 6 show the upper 22 and lower damping element 24 in a perspective view. According to this view, the first damping element 22 has a flat cylindrical shape, whereas the second damping element 24 has a flat, rectangular shape with rounded corners.

The task of the first damping element 22 is to restrict the relative movement between the fastening element 8 and the flat part 2, 2a and/or the joining part 10, 10a through a force applied to the fastening element 8. The damping element 22 should preferably be arranged directly and immediately on the fastening element 8. The damping element 22 should ideally have a surface form that is as close as possible to that of the surface of the fastening element 8 bordering the damping element 22.

Thus, in an embodiment in which a nut is used as the fastening element 8, a cylindrical shape with an external diameter similar to the external diameter of the nut would be ideal.

The second damping element 24 is expediently arranged on a surface of the anvil 26 turned towards the flat part 2, 2a, preferably between the anvil 26 and the flat part 2, 2a, particularly opposite the first damping element 22. In particular, the second damping element 24 can be held between the anvil 26 and the holding unit 16.

In the case of a fastening element 8 arranged on a flat part 2, 2a, in addition to the positioning of the flat part 2, 2a through a holding unit 16 and in addition to the restriction of movability by means of a first damping element 22, it would be desirable for the supporting damping to be below the flat part 2, 2a, particularly opposite the first damping element 22. If no damping element at all were present, then it can be assumed that the surface of the flat part 2, 2a in the area of the contact surface with the anvil 26 would become damaged during ultrasonic welding.

According to an exemplary embodiment the first 22 and second damping element 24 can be made from an elastic material, particularly from polyurethane. Apart from polyurethanes other elastic materials with good damping characteristics such as rubber or plastic foam could also be used.

Figure 7:
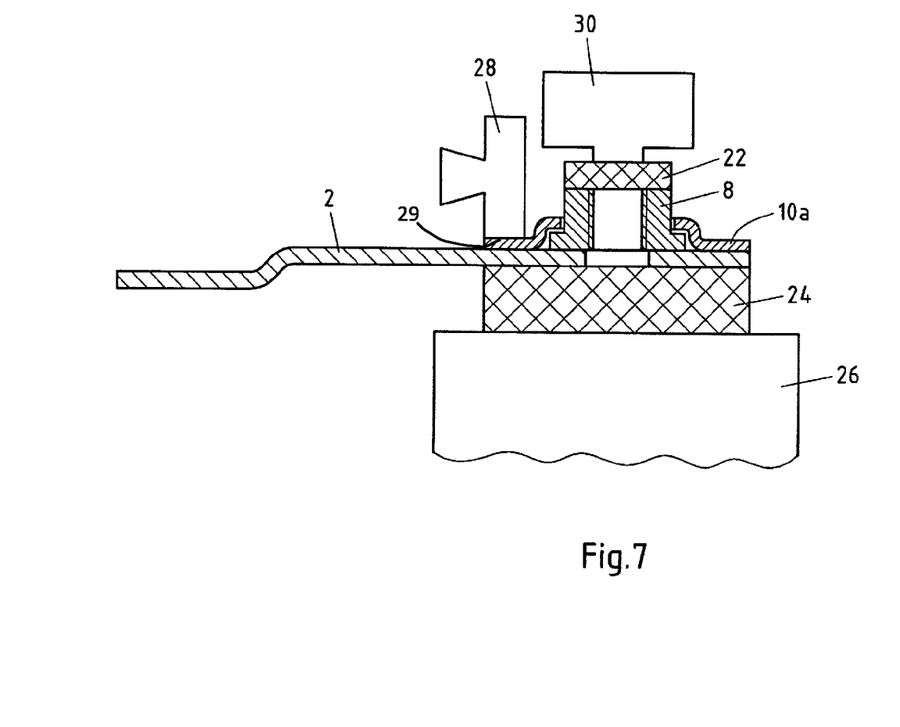
FIG. 7 a sectional view of an arrangement of a fastening element held in a positively locking manner with laterally arranged sonotrode and by way of example a nut as fastening element.

FIG. 7 is a sectional view of an arrangement of a fastening element 8 held in a positively locking manner with a sonotrode 28 arranged laterally and separately from the holding arm 30 and by way of example a nut as fastening element. According to the view the nut is held by two joining parts 10a and a flat part 2, 2a in a positively locking manner. A first damping element is arranged on the nut, held down on the nut by a holding arm. Additionally, a second damping element 24 is introduced between the anvil 26 and the flat part 2, 2a. A sonotrode 28 laterally positioned to the nut can be pressed on a joining part 10a.

Through the lateral arrangement of the sonotrode 28 shown one or more joining parts 10, 10a can be joined together without problems in a substance-to-substance manner by ultrasonic welding, whereas the relative movement between a fastening element 8 held in a positively locking but rotatable manner and/or joining part 10, 10a is restricted via a first damping element 24. Here, the restriction of movement can be achieved via a force applied by a holding arm 30 vertically on the surface of the damping element 22.

Figure 8:
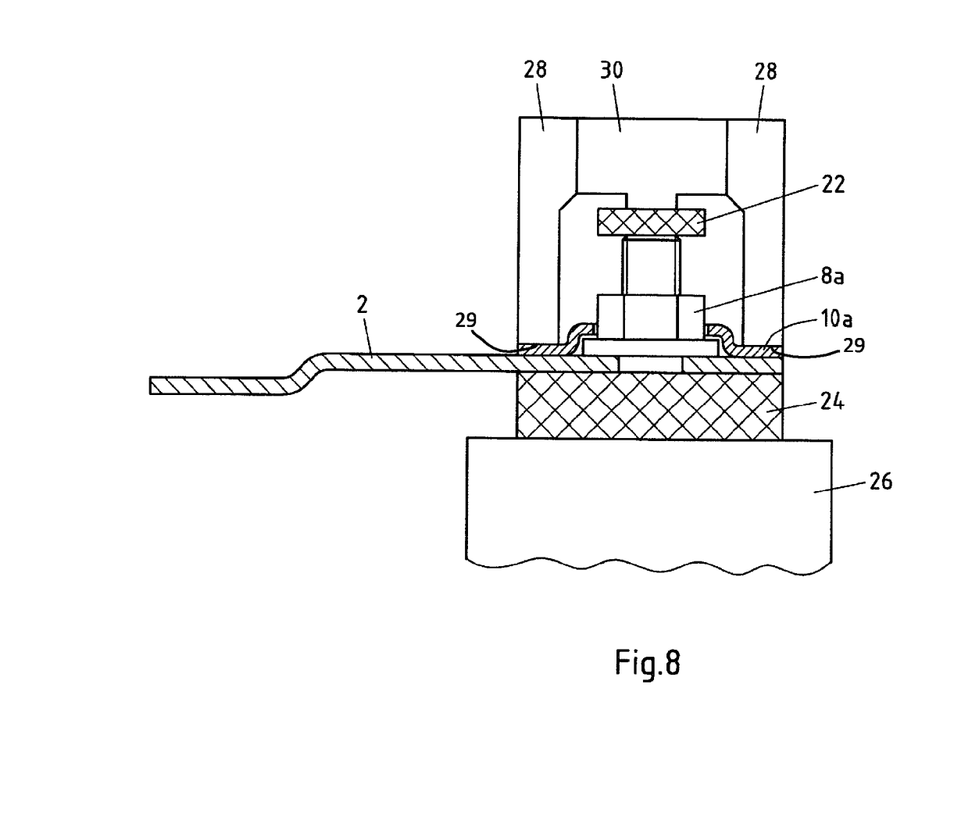
FIG. 8 a sectional view of an arrangement of a fastening element held in a positively locking manner with U-shaped sonotrode arranged on a holding arm and by way of example a screw as fastening element.

Apart from a laterally arranged sonotrode 28 the joining parts 10a can also be connected via a U-shaped sonotrode 28 shown in FIG. 8 with the flat part 2a in a positively locking manner.

FIG. 8 is a sectional view of a fastening element 8a held in a positively locking manner with a U-shaped sonotrode 28 arranged on a holding arm 30 and by way of example a screw as the fastening element 8a.

The use of a U-shaped sonotrode 28 is recommended when using two joining parts 10a, because in this way both joining parts 10a can be welded simultaneously to the flat part 2a. In the arrangement represented of the U-shaped sonotrode 28 on a holding arm 30 a corresponding device for damping must be provided, so that the mechanical oscillations transmitted to the sonotrode 28 are not transmitted to the holding arm 30. Alternatively, the U-shaped sonotrode 28 can therefore also be introduced separately from the holding arm 30 to the parts to be welded. The possibility also exists of arranging a holding arm, able to exert the force necessary for damping the corresponding movable parts on the first damping element, in a fixed manner on the holding unit.

Figure 9:
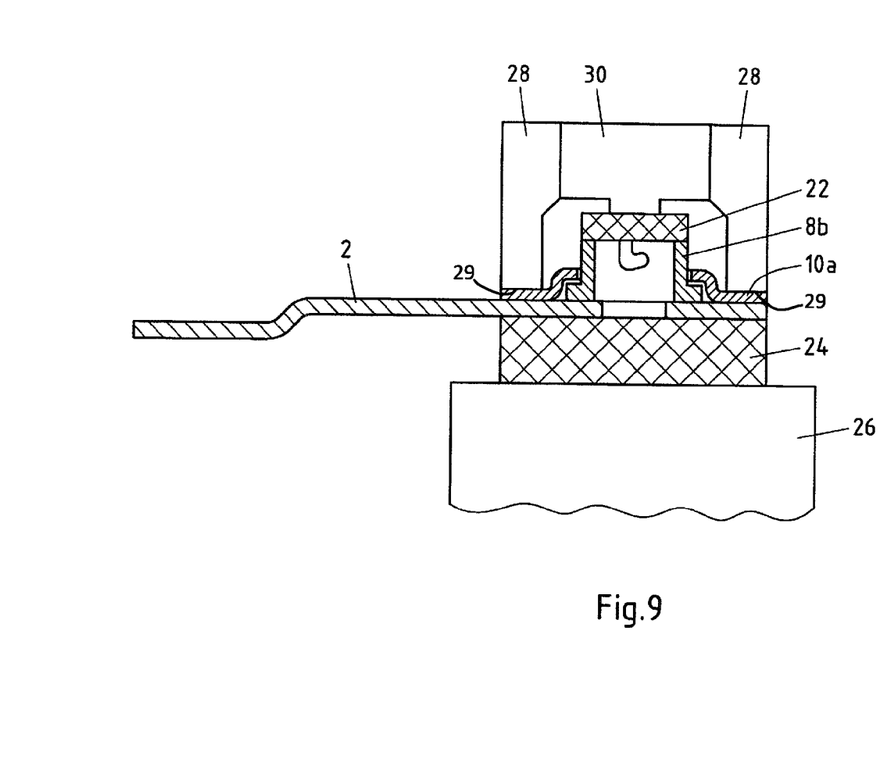
FIG. 9 a sectional view of an arrangement of a fastening element held in a positively locking manner and by way of example a bayonet fastener as the fastening element with a U-shaped sonotrode arranged on a holding arm.

FIG. 9 is a sectional view of the arrangement of a fastening element 8b held in a positively locking manner with a U-shaped sonotrode 28 arranged on a holding arm 30 and by way of example a bayonet fastener as the fastening element.

Apart from a nut 8, a screw 8a, or a bayonet fastener 8b other fasteners can be secured to a flat part 2, 2a, while these are held in a positively locking and rotatable manner to a flat part 2, 2a.

Figure 10:
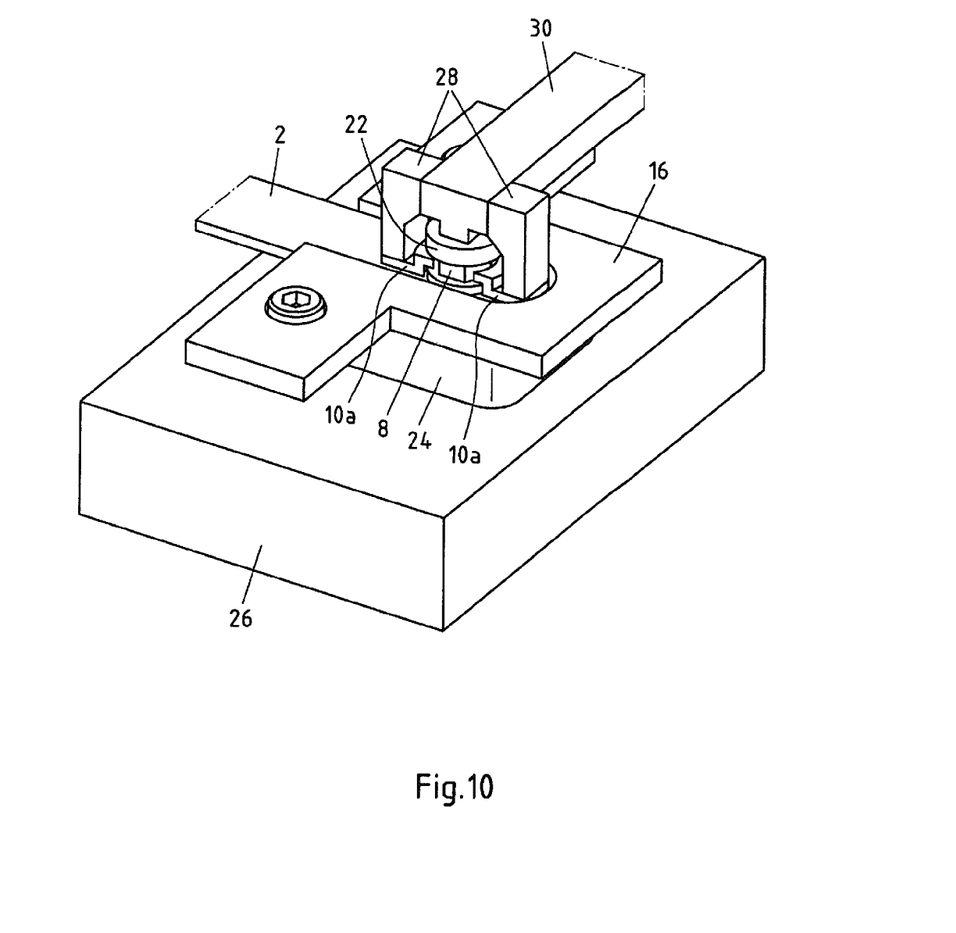
FIG. 10 a perspective representation of an arrangement of a fastening element held in a positively locking manner with a U-shaped sonotrode arranged on a holding arm.

FIG. 10 is a perspective representation of an arrangement of a fastening element 8 held in a positively locking manner with a U-shaped sonotrode arranged on a holding arm 30.

The embodiment in FIG. 10 shows a nut with a collar 9 pointing radially outwards as an example of a fastening element 8. The nut is held in a simultaneously rotatable and positively locking manner between two joining parts 10 a and a flat part 2a, while the flat part 2a is in turn damped by a second damping element 24 and pressed on an anvil 26 and the nut 8 is surrounded on three sides by a holding unit 16 with U-shaped recess. The holding unit 16 is secured via two screws to the anvil 26. The relative movement between the rotatably arranged fastening element 8 and the flat part 2 and/or at least one joining part 10 is also restricted via a first damping element 22. The force to be applied for this vertically to the surface of the first damping element 22 is applied by a holding arm 30, positioned above the first damping element 22. On the holding arm 30 a U-shaped sonotrode 28 is arranged, which presses on the connecting surfaces of the joining parts 10a and can weld these by the ultrasonic welding method to the flat part 2a.

FIG. 11 is a sectional view of a captive fastening element 8 according to FIG. 3a, 3b. Here a sonotrode 28 is provided on the first end of the flat part 2, for welding a cable end to the flat part 2. To this end the bare cable ends, particularly in aluminium, are welded ultrasonically to the flat part 2. The oscillation introduced in this way into the flat part is transmitted to the fastening element 8. Through the pressing of the damping element 22, however, the fastening element 8 is damped. Simultaneously, through the contact pressure, e.g. 6-8 bar, of the damping element 22 on the fastening element 8 an elastic deformation of the flat part 2 is brought about. This leads to a spring tension in the flat part 2, whereby this similarly functions as an oscillation damper and damps the USW oscillations.

On the fastening element 8 a first damping element 22 is arranged, held down by a holding arm 30. A second damping element 24 is also introduced between the anvil 26 and the flat part 2, 2*a*. Here, the second damping element 24 is preferably in contact only with the flat part 2, but not with the fastening element 8.

The relative movement between the fastening element 8 and the flat part 2, 2*a* and/or joining part 10, 10*a* is restricted via a first damping element 24. Here, the restriction of movement can be achieved via a force applied by a holding arm 30 perpendicularly to the surface of the damping element 22.

It can also be seen that the damping element 22 is pressed into a blind hole 31 in the holding arm 30.

FIG. 12 is a perspective representation of an arrangement of a captive fastening element 8 according to FIG. 3*a*, *b* with a holding arm 30 arranged on side pushers 30*a*.

The flat part 2 is initially placed between the side pushers 30*a*. Here the flat part 2 is aligned with the fastening element 8 via the holding unit 16. Then, the side pushers 30*a* are slid together and the flat part 2 is thus held between the side pushers. A sonotrode 28 is moved in the direction of the anvil 26 on one side of the side pushers 30*a*. In this way, the sonotrode is pushed onto the cable ends in order to weld these with the flat part by means of USW.

Simultaneously, the holding arm 30 is moved at an angle to the movement of the side pushers 30*a* towards the fastening element 8. In this way, the damping element 22 is pressed onto the fastening element 8 and the fastening element 8 is damped against oscillations.

The relative movement between the rotatably arranged fastening element 8 and the flat part 2*a* is restricted via the first damping element 22. The force to be applied for this purpose to the surface of the first damping element 22 is applied by a holding arm 30, positioned over the first damping element 22. The contact pressure can be more than 1 bar, preferably less than 8 bar, particularly between 2 and 8 bar, preferably approximately 6 bar.

Particularly advantageously, the ultrasonic welding device has a modular structure with at least one fastening element and/or at least one damping element. This allows the possibility of a particularly simple, purely mechanical, implementation of the device in other existing systems. Through the simple nature of the retrofitting, no further subsequent changes are necessary. Thus, a holding arm can also be permanently arranged on the holding unit, which can then by flexible adjustment, similar to a screw clamp, apply the necessary force for damping the corresponding moving part to the first damping element.

What is claimed is:

1. A method of ultrasound welding comprising:
arranging a connection part at a first area of a cable shoe, wherein the cable shoe is held in a recess of a holding unit in a positive locking manner between a sonotrode and an anvil, such that the cable shoe is aligned with the sonotrode and the anvil;
mounting a fastening element at a second different area from the first area on the cable shoe such that the fastening element is held rotatable about its longitudinal axis in a free running manner by the connection part on the cable shoe;
pressing a first damping element onto the fastening element while the connection part is welded onto the cable shoe by the sonotrode, wherein the first damping element is pressed onto the fastening element to prevent rotational movement of the fastening element while the connection part is welded onto the cable shoe; and
applying ultrasonic oscillations to the sonotrode to form a weld between the cable shoe and the connection part.

2. The method according to claim 1, wherein the rotational movement between the fastening element and the cable shoe is restricted via the pressing applied by a holding arm through the damping element.

3. The method according to claim 2, wherein the pressing applied by the holding arm through the damping element against the fastening element is a contact pressure between 3 bar and 6 bar.

4. The method according to claim 2, wherein the holding arm presses the damping element against the fastening element such that the cable shoe is elastically deformed.

5. The method according to claim 1, wherein the fastening element is a screw.

6. The method according to claim 1, wherein the fastening element has a collar pointing radially outwards.

7. The method according to claim 1, wherein the fastening element is a nut.

8. The method according to claim 1, wherein the fastening element is a twist and lock fastener.

9. The method according to claim 1, wherein the fastening element is a bayonet fastener.

* * * * *